United States Patent [19]

Vander Heyden

[11] Patent Number: 5,551,282
[45] Date of Patent: Sep. 3, 1996

[54] METHOD AND APPARATUS FOR MEASURING VOLUME CORRECTION USING MOLAR QUANTITIES

[75] Inventor: William H. Vander Heyden, Mequon, Wis.

[73] Assignee: Badger Meter, Inc., Milwaukee, Wis.

[21] Appl. No.: 407,456

[22] Filed: Mar. 20, 1995

[51] Int. Cl.$^6$ .............................. G01F 1/86; G01F 15/02; G01N 9/00
[52] U.S. Cl. ................. 73/30.03; 73/30.01; 73/861.02; 73/861.01; 73/30.02; 73/23.20; 374/36
[58] Field of Search .................. 73/23.2, 25.01, 73/30.01, 30.02, 30.03, 30.04, 861.01, 861.02, 861.03, 195, 196; 374/36

[56] References Cited

U.S. PATENT DOCUMENTS

| | | |
|---|---|---|
| 3,267,729 | 8/1966 | Cowburn .......................... 73/863.01 |
| 3,701,280 | 10/1972 | Stroman ............................ 73/23.2 |
| 4,379,402 | 4/1983 | Harman, III ....................... 73/23.2 |
| 4,527,418 | 7/1985 | Arcara ............................. 73/30.01 |
| 4,677,841 | 7/1987 | Kennedy ........................... 73/30.03 |
| 5,201,581 | 4/1993 | Vander Heyden et al. ........... 374/36 |
| 5,226,728 | 7/1993 | Vander Heyden .................. 374/36 |
| 5,307,668 | 5/1994 | Vander Heyden .................. 73/30.02 |
| 5,323,657 | 6/1994 | Vander Heyden .................. 73/861.02 |
| 5,357,809 | 10/1994 | Vander Heyden ................. 73/861.02 |

FOREIGN PATENT DOCUMENTS 2664975  1/1992  France .

*Primary Examiner*—Hezron E. Williams
*Assistant Examiner*—Daniel S. Larkin

[57] ABSTRACT

A method and apparatus for measuring volume correction in a gas pipeline using a variable volume chamber where the gas is sampled at the temperature and pressure of gas in the pipeline. A portion of a known volume of sample gas is released and a change of volume in the sample chamber is measured with respect to time, while maintaining temperature and pressure at pipeline conditions. The sample gas is then measured for molar flow rate at near base conditions, and this is used to calculate the molar density of the gas. Because the molar density of the gas has been measured at pipeline conditions, it can be multiplied by volumetric flow rate in the pipeline to provide base volumetric flow rate of the pipeline gas. A heating analyzer is provided to determine heat content of the gas, and this is multiplied by volumetric flow rate to determine energy flow rate.

28 Claims, 2 Drawing Sheets

METHOD AND APPARATUS FOR MEASURING VOLUME CORRECTION USING MOLAR QUANTITIES

BACKGROUND OF THE INVENTION

The field of the invention is flow meters for measuring the volumetric flow rate and the energy flow rate of gases in a pipeline.

The measurement of volumetric flow rate in gas pipelines has been the subject of research and development for many years.

In gaseous flows, the phenomenon of compression exists and has a large effect. It allows the number of molecules for a given volume to change with pressure and temperature as well as with composition. Therefore, it is desirable to make natural gas sales transactions either by mass, energy, or at standard pressure and temperature conditions. In the U.S., for example, the standard pressure and temperature of gas is stated as 14.73 psia and 60° F. for many transactions. Delivery calculations state the flow is adjusted to correspond to these base conditions even though the actual gas in the transaction is probably at a different pressure or temperature. A piece of equipment designed to accomplish the task of converting a measured volumetric flow rate to a base volumetric flow rate at a defined pressure and temperature is referred to as a "volume corrector".

In the traditional method of gas measurement, a volume correction ratio $Q_b/Q_f$ is determined from the pipeline flow conditions using the following relation:

$$\frac{Q_b}{Q_f} = \frac{T_b}{T_f} \frac{P_f}{P_b} \frac{Z_b}{Z_f} \quad (1)$$

where $Q_f$ is the measured volumetric flow rate of the pipeline gas through the pipeline, $T_b$ and $P_b$ are the base condition temperature and pressure (e.g., 14.73 psia and 60° F.), $T_f$ and $P_f$ are the measured flow temperature and pressure of the pipeline gas in the pipeline, $Z_b$ and $Z_f$ are the supercompressibility factors at the base condition and the flow condition, respectively, and $Q_b$ is the base condition volumetric flow rate. Such a calculation is typically carried out in a flow computer.

Using the relation in Eq. (1) to compute base condition volumetric flow rate $Q_b$ requires accuracy in the measurement of the flow temperature $T_f$ and pressure $P_f$. This requires that pressure and temperature sensors for monitoring $P_f$ and $T_f$ be calibrated frequently.

The supercompressibility ratio $Z_b/Z_f$ in Eq. (1) is difficult to measure. One known way to measure the composition of the gas uses gas chromatography. In this method, the supercompressibilities, $Z_b$ and $Z_f$, are estimated from either the virial equations of state, or from precalculated correlations such as NX-19 or the more recent Gerg Equations. Alternatively, a meter that measures heating value, relative density, $\%CO_2$ and $\%N_2$ can be used to calculate the ratio $Z_b/Z_f$. This is because the Gerg Equations in their short form allow calculation of the ratio $Z_b/Z_f$ from these parameters.

Knowledge of the values of the virial coefficients of particular gas compositions is quite limited so calculation of supercompressibility from the virial equation of state is not always possible. The Gerg Equations and NX-19 correlation are mathematical models obtained by mapping known and measured properties. The Gerg Equations, in particular, are very good over a wide range of compositions. Use of the Gerg Equations, however, requires either a chromatograph or a special meter to measure the properties needed to solve the short form Gerg Equations, and both of these techniques are considered expensive. It has, therefore, been difficult to obtain accurate measurement of the supercompressibility ratio $Z_b/Z_f$ in a cost effective manner.

In Vander Heyden, U.S. Pat. Nos. 5,307,668, and 5,323,657, these problems were addressed by providing a sampling device for sampling the pipeline gas and relating the mass flow rate of the sample to the pipeline gas. The methods and apparatus disclosed there overcame the problem of using inferred values. However, the technique of measuring volumetric flow rate of the sample gas at base conditions utilized the measurement of energy flow rate and heating content of the sample gas at these conditions, which involved combusting a sample of the gas.

The present invention is a further improvement in measuring volumetric flow rate of gas in a pipeline, which is responsive to the composition and the density of the particular gas flowing in the pipeline. The invention solves the problem of measuring the volumetric flow rate at pipeline temperature and pressure and provides a method for relating the volumetric flow rate measurement to base temperature and pressure without combusting the gas.

SUMMARY OF THE INVENTION

This invention furthers the art of direct measurement of energy and volumetric flows. The significant feature of the invention is the direct measurement of molar density, which overcomes the problem of measuring gases in a pipeline that are subject to supercompressibility.

According to the invention a sample of pipeline gas is captured in a variable volume chamber while maintaining the gas at temperature and pressure of gas in the pipeline.

The sample gas is then released from the variable volume chamber while varying the volume of the chamber to maintain temperature and pressure of gas remaining in the chamber at the temperature and pressure of gas in the pipeline.

The molar density of the pipeline gas is calculated from the change of volume and the time period during which the chamber changes from a first volume to a second volume, and from the molar flow rate of the gas.

The molar density can then be used to calculate a correction factor to be applied to the gas in the pipeline to determine pipeline flow rate at base conditions.

The invention allows measurement of molar flow quantities at base pressures near one atmosphere, so that any error in measuring supercompressibility (Z) of the gas is reduced to the order of ±0.1 percent.

The invention is a further improvement in volumetric flow measurements which use a primary flow meter in the pipeline.

The present invention can be used with either combustible or noncombustible gases. Because the invention does not necessarily rely on combustion methods to determine gas composition, it is useful for both combustible and noncombustible gases, so long as the gas remains in a gaseous state.

These and other objects and advantages, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DESCRIPTION OF THE PREFERRED EMBODIMENT

Figure 1:
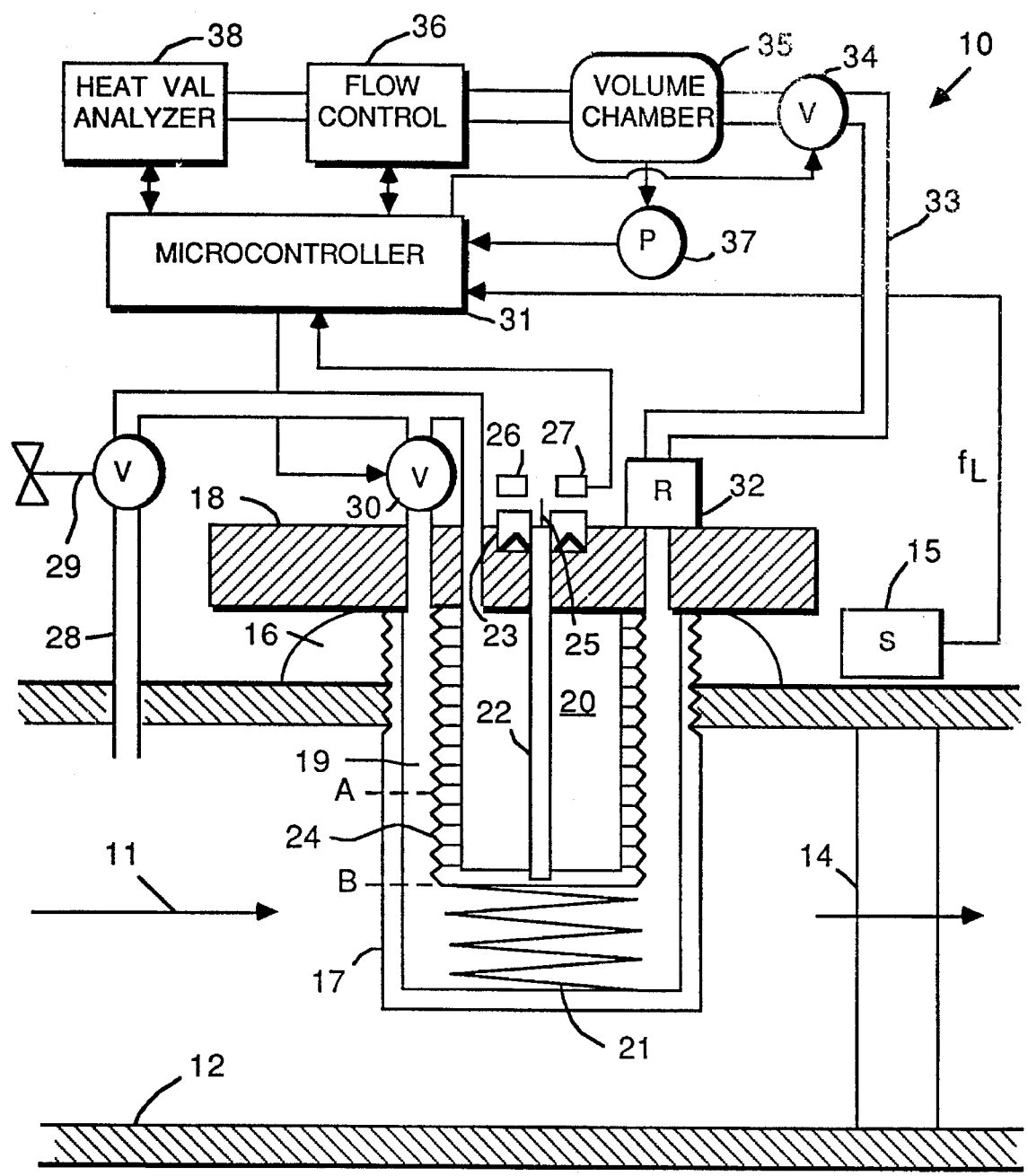
FIG. 1 is a schematic diagram of a flow meter for practicing the method of the present invention.

Referring to FIG. 1, there is shown an apparatus represented generally by reference number 10 for practicing the method of the present invention.

A gas, represented generally by arrow 11 flows through a gas pipeline 12. The velocity of this flow is measured by a linear flow meter indicated generally by element 14 and sensor 15. The sensor 15 is positioned outside the pipeline 12 to sense each revolution of the flow meter 14. The sensor 15 generates a signal $f_L$ that is linearly proportional to velocity of the gas flow. While the pipeline flow meter is depicted as a turbine meter, it could be any of several other forms of gas pipeline meters, including a vortex meter or an ultrasonic meter, which are considered equivalents for the purposes described herein.

A fitting 16 with a threaded opening is welded to the pipeline 12. A thermally conductive cylinder 17 with an external thread is screwed into the fitting 16. The threads are mated with appropriate sealing material to assure a pressure seal on the pipeline 12.

A flange 18 is mounted on top of the cylinder 17. A bellows 24 extends downwardly from its attachment to the flange 18 to provide a first chamber 19 external to the bellows but internal to the cylinder 17 and a second chamber 20 within the bellows 24.

The first and second chambers 19, 20 are heat sunk into the pipeline gas 11 to assure that gas received in these chambers 19, 20 is maintained at the temperature of the pipeline gas 11. The second volume chamber 20 is maintained at pipeline pressure by direct connection to the pipeline 12. The second chamber 20 is variable to change its volume and the volume of the first chamber 19.

A compression spring 21 is positioned between the bottom of the bellows 24 and a bottom interior wall of the cylinder 17. The compression spring 21 is loaded by the extension of the bellows 24 from a first position represented by height A to a second position represented by height B in FIG. 1. The energy stored by the compression of the spring 21 provides a force to return the bellows to position A, when the pressure in chamber 19 is equal to the pressure in chamber 20.

A central shaft 22 extends through the bellows 24 and upwardly through a port in flange 18 which is sealed by packing 23. At the upper end of the shaft 22 is a knife blade 25. At its uppermost position, knife blade 25 is positioned between a light-emitting diode 26 and a light-sensitive detector 27. In this position, knife blade 25 interrupts the path of light and provides an open condition to the circuit which includes light-emitting diode and the light-sensitive detector 27. When bellows 24 is in its extended position B, the knife blade 25 is below the light transmitting path, and the switch represented by elements 26, 27 is in a closed condition that completes an electrical circuit. The open and closed states of the switch elements 26, 27 are sensed by microcontroller 31.

A sample gas line 28 suitable for flowing a sample of the pipeline gas is mounted on the pipeline 12. The sample gas line 28 is connected through a manual shutoff valve 29 for convenience of maintenance. Chamber 19 is connected to pipeline 12 through on-off control valve 30. Chamber 20 is maintained at pipeline pressure by connection to the pipeline 12 through valve 29.

The open and closed states of this valve 30 are controlled from microcontroller 31. Microcontroller 31 is a suitable microelectronic CPU, with associated memory and interface circuitry for controlling the devices shown in FIG. 1.

Control valve 30 is opened to allow the pipeline gas to flow to the volume chamber 19 substantially filling the chamber until pipeline pressure is achieved in the volume chamber 19. Valve 30 is closed when it is desired to isolate the volume chamber 19 from the pipeline. This action is taken to establish an initial volume of the pipeline gas for further processing.

Such further processing includes measuring the time in which chamber 19 changes volume and the flow rate of sample gas which is withdrawn from chamber 19 during such change of volume.

The following is a description of the operation to measure the time in which chamber 19 changes volume. At a starting position A, bellows 24 is contracted as a result of force provided from spring 21. Valve 30 is normally open to provide gas at pipeline pressure and temperature to volume chamber 19. Under control of microcontroller 31, control valve 30 is closed stopping gas flow to chamber 19. As gas flows out of chamber 19 through pressure regulator 32, a small differential pressure develops between chamber 19 and chamber 20 and bellows 24 extends into chamber 19, while substantially maintaining the same pressure in chamber 19 and chamber 20, except for a small differential pressure created by the spring 21. The extension of bellows 24 to position B decreases the volume of chamber 19 and increases the volume of chamber 20 by a corresponding amount, while maintaining pressure and temperature of the gas at pipeline conditions.

As seen in FIG. 1, the expansion of the bellows 24 retracts shaft 22 to position B where withdrawal of knife edge 25 exposes detector 27 to light from source 26. Microcontroller 31 then senses the optical coupling between source 26 and detector 27 and re-opens valve 30. This will increase pressure in chamber 19 to return bellows 24 to position A. The time duration for the change in volume, 4, corresponds to the time between closing valve 30 and reopening valve 30 and is timed by the microcontroller 31.

While the embodiment described here utilizes central shaft 22, knife edge 25 and elements 26, 27, it should be understood that other types of electrical and mechanical position and proximity sensors utilizing electrical contact switches, electromagnetic switches, capacitive switches or piezoelectric elements, could be used to sense changes in movement of an element such as bellows 24 and a corresponding change in volume. And instead of bellows 24, another embodiment could use a piston equivalent in which a change in volume occurs in response to movement of a piston.

In order to measure flow rate of gas withdrawn from chamber 19, chamber 19 is in communication with gas line 33 through pressure regulator 32, Which is mounted on flange 18. A flow meter of the type disclosed in Kennedy, U.S. Pat. No. 4,285,245 includes on-off control valve 34, volume chamber 35, and flow control 36 all connected in gas line 33, and also includes pressure transducer 37. On-off valve 34 is similar to valve 30 and is controlled by signals from microcontroller 31.

Gas flows to volume chamber 35 through valve 34. When chamber 35 substantially reaches a preset pressure, usually a pressure just larger than atmospheric pressure, valve 34 closes. As gas flows from chamber 35, its flow rate is determined by flow control 36. Pressure in volume chamber 35 falls and is measured by pressure transducer 37. A timer in microcontroller 31 measures the sample time, $\Delta t_s$, required for the pressure to fall between two preselected pressures.

The elements 34, 35 and 36, form a molar flow meter which operates independent of molecular weight and is preferred for gases where mixture may change composition. It should also be clear that for applications where the molecular weight is known, such as pure gas flows, or where molecular weight is measured, a volume or mass flow meter could produce molar flow rate through multiplication or division of its signals by molecular weight.

If it desired to measure heat content, the gas is next flowed to a heating valve analyzer 38 of a type known in the art. Such an analyzer 38 can perform constituent analysis, using equipment such as a gas chromatograph. Such an analyzer can also use combustion equipment, such as a calorimeter, or the combustion equipment and maximum flame temperature methods disclosed in Clingman, U.S. Pat. No. 4,396,299, issued Aug. 2, 1983. With the analyzer 38 located locally, heating values can be determined on a real-time basis. With such an analyzer 38 located remotely from the apparatus 10, average values of heat content of the gas can be used. As known in the art, and disclosed in Eq. 5, U.S. Pat. No. 5,323,657, cited above, the energy flow rate of the sample gas ($E_{sample}$) can be calculated by multiplying the base volume flow rate ($Q_b'$) by the base heating value for the sample gas ($H_{sample}$). If only volumetric flow rate and not energy flow rate is to be measured, heat content need not be analyzed, and the gas from the flow control 36 can be handled according to approved methods for handling waste gas.

The state of the gas in sample chamber 19 with valve 30 open is described by the real gas law as:

$$P_L V_L = n_L Z_L R T_L \tag{2}$$

where:

$P_L$ is the absolute pressure of the gas in chamber 19;

$V_L$ is the volume of the chamber 19;

$n_L$ is the number of moles of gas in the chamber 19;

$Z_L$ is the supercompressibility of the gas in the volume chamber 19;

R is the gas constant; and $T_L$ is the absolute temperature of the gas in the volume chamber;

The subscript "L" represents the gas at the pipeline conditions. Flow through pressure regulator 32 results in molecules of the gas being withdrawn from volume 19. As a result, a small differential pressure exists between volume 19 and volume 20. In response, volume 20 increases its displacement maintaining the pressure in volume 19 substantially unchanged. Therefore, the molar density of the pipeline gas can be determined as:

$$D_m = \frac{\Delta n}{\Delta V} = \frac{\dot{n}\tau}{\Delta V} \quad \left(\frac{\text{moles}}{\text{volume}}\right) \tag{3}$$

where $D_m$ is the molar density of the pipeline gas, $\dot{n}$ is the molar flow rate of the gas from chamber 19 and time interval $\tau$ is the time required for volume 19 to change, by $\Delta V$, from one mechanical position to a second mechanical position. In equation (2) the value of $\Delta n$ is unknown, but can be calculated from molar flow rate and the time interval 4.

The molar flow rate $\dot{n}$ is measurable with the molar flow meter comprising valve 34, chamber 35, and by flow control 36. Pressure in volume chamber 35 falls by an amount $\Delta P_s$ and is measured by pressure transducer 37. A timer in microcontroller 31 measures the time, $\Delta t_s$, required for the pressure to fall between two preselected pressures.

The molar flow rate $\dot{n}_s$ can be further described by the following equation as:

$$\dot{n}_s = \frac{\Delta P_s V_s}{\Delta t_s R T_s Z_s^2} \quad \left(\frac{\text{moles}}{\text{time}}\right) \tag{4}$$

where the subscript "s" relates to the sample gas flowing from chamber 35.

Substituting equation (4) for $\dot{n}$ in equation (3), results in the following equation (5) for density:

$$D_m = \frac{\Delta P_s V_s \tau}{\Delta t_s R T_s Z_s^2 \Delta V_L} \quad \left(\frac{\text{moles}}{\text{volume}}\right) \tag{5}$$

Since the same molar flow rate $\dot{n}$, in equation (3), is also the molar flow rate $\dot{n}_s$ as described in (4), then molar density $D_m$ in equation (5) can be calculated by measuring the time $\tau$ required to have the bellows move to vary the volume of chamber 19 by an amount $\Delta V$.

The volume ($V_m$) occupied by a mole of ideal gas at a temperature of 459° R. (273.15° K.) and an absolute pressure of 14.696 psia (1.01325 kpa) is known to be 22.4138 liters or 0.63445 cubic feet. This volume is the volume occupied by the number of molecules described by Avogadro's Number. This volume ($V_m$) may be translated to a molar volume ($V'_m$) of a real gas at another base temperature and pressure utilizing the following equation:

$$V_m = Z_m V_m \left(\frac{273.15}{T_b}\right) \left(\frac{P_b}{14.696}\right) \left(\frac{\text{volume}}{\text{mole}}\right) \tag{6}$$

where $T_b$ and $P_b$ are the base temperature and pressure selected. Multiplying (5) and (6), the pipeline volumetric correction factor at base conditions is:

$$\text{Volume Correction} = D_m V'_m \tag{7}$$

The volume correction equals the molar density, calculated from equation (5) multiplied by the molar volume at base temperature and pressure as given in equation (6). This volume correction factor is a significant quantity, which can be used with a flow meter in the pipeline to calculate the volumetric flow rate at base temperature and pressure according to the following simple relationship:

$$Q_b = Q_L (D_m V'_m) \tag{8}$$

where $Q_b$ is the base volumetric flow rate, $Q_L$ is uncorrected volumetric flow rate from the pipeline flow meter, and the quantity in parentheses is the volume correction factor from equation (7). The primary flow meter 14 located in the pipeline 12 produces a signal proportional to the volume flow rate in the pipeline at pipeline density This may be described, without limitation, as:

$$Q_L = K_L f_L \left(\frac{\text{volume}}{\text{time}}\right) \tag{9}$$

where:

$Q_L$ is the volume flow rate $K_L$ is a scaling constant $f_L$ is a volume signal such as a frequency, etc.

The volumetric flow rate at base conditions can also be represented by the following equation, which takes into account the effects of compressibility (Z).

$$Q_b = \left(\frac{K_L V_m V_s}{R \Delta V}\right)\left(\frac{273.15}{14.696}\right)\left(\frac{P_b}{T_b}\right)\left(\frac{Z_m}{Z_s^2}\right)\left(\frac{\Delta P_s \tau f_L}{\Delta t_s T_s}\right)\left(\frac{\text{volume}}{\text{time}}\right) \quad (10)$$

In equation (10), the first three terms on the right side are constants or calibrated fixed values. The fourth term is a compressibility ratio that can be defined in virial terms as:

$$\frac{Z_m}{Z_s^2} = \frac{1 + bP_m}{1 + 2bP_s} = 1 + b(P_m - 2P_s) \quad (11)$$

and $P_m$ is always about 1 atmosphere whereas $P_s$ is the measurement pressure of the molar flow meter and is about 1.5 atmospheres. Typical values for the second virial term 'b' is $-0.002 \pm 0.001$. Therefore, the error caused by the fourth term of equation 9) is about $\pm 0.1\%$ maximum.

Figure 2:
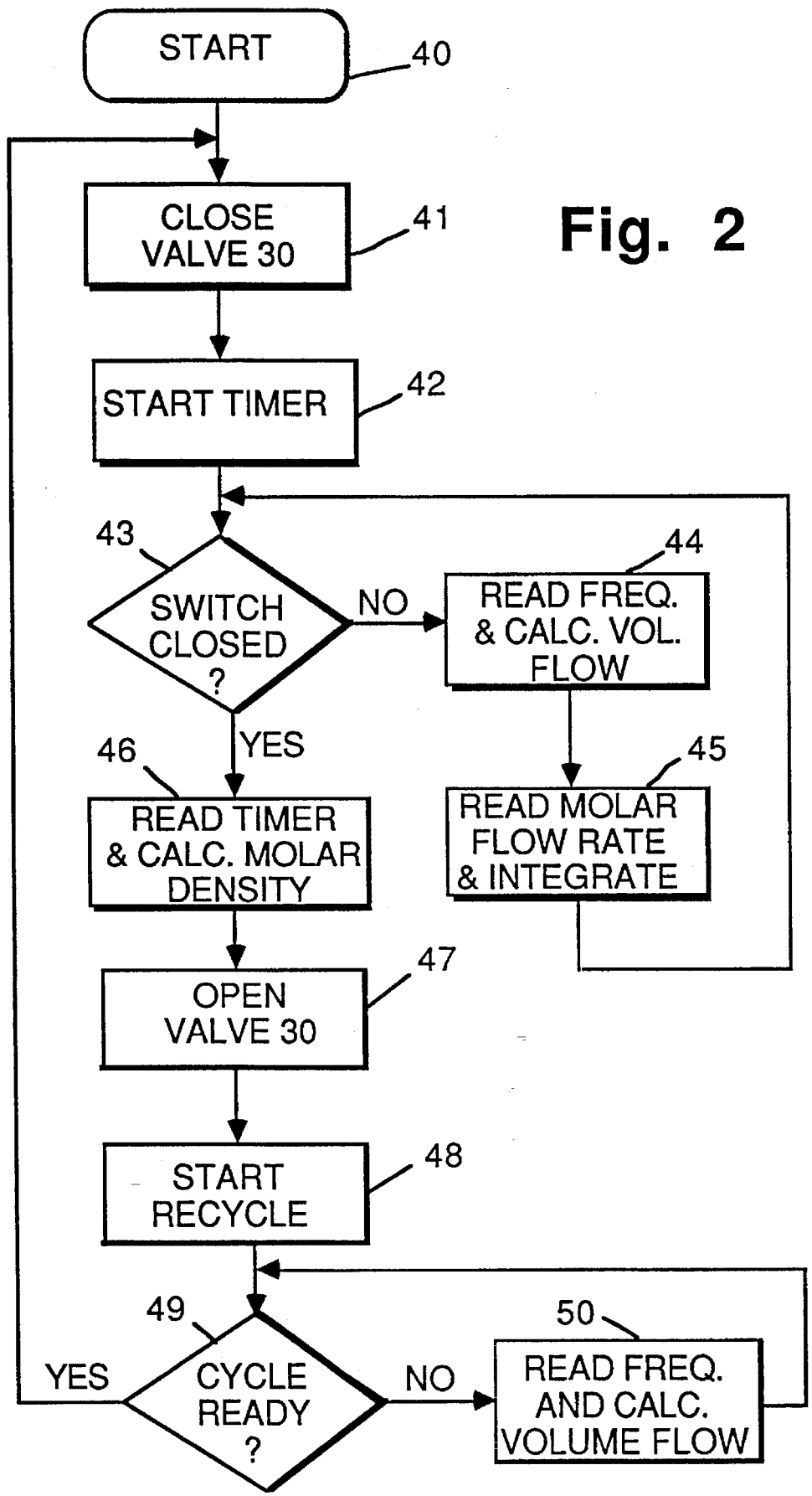
FIG. 2 is a flow chart of the method of the present invention as performed by the apparatus of FIG. 1.

FIG. 2 illustrates operation of the apparatus of the invention. Block 40 represents the start of a portion of the microcontroller operation, which is of particular interest in relation to the invention. These operations are carried out by the microcontroller 31, by executing program instructions in a program stored in a memory (not shown). At the starting position, represented by block 40, it shall be assumed that valves 29 and 30 have been open for sufficient time to fill chambers 19, 20 with gas from the pipeline 12. The gas in chambers 19 and 20 is at the same pressure as the pipeline gas. Due to the location of the thermally conductive cylinder 17, the temperature of the gas in chamber 19 is substantially the same as the temperature of gas in the pipeline. The gas in chamber 20 is further removed, but its temperature would be close to the temperature of gas in the pipeline 12.

As represented by block 41, the microcontroller 31 first generates a signal to close valve 30. Gas flows from chamber 19 through pressure regulator 32. Next, as represented by block 42, the microcontroller 31 starts a timer to time the period in which gas flows out from chamber 19, until the volume of the chamber 19 changes from the volume when bellows 24 is at position A to the smaller volume when bellows 24 is at position B. At this position, the knife blade 25 is withdrawn to its lower position and the switch formed by elements 26, 27 is closed as represented by the "YES" decision from decision block 43. Until the knife blade 25 is withdrawn to its lower position, the switch formed by elements 26, 27 is open as represented by the "NO" decision from decision block 43.

During this period of operation, the microcontroller 31 executes instructions represented by process block 44, to read the pipeline flow meter frequency signal, $f_L$, and calculates volume flow in the pipeline 12. Also, during this period, as represented by block 45, the microcontroller 31 closes and then opens valve 34. This causes pressure to drop in chamber 35 as gas flows out through flow control 36. The microcontroller 31 performs an integration of pressure signals read from transducer 37 over some period of time to determine molar flow rate. The microcontroller 31 loops back to test for the completion of the cycle by again executing instructions represented by decision block 43.

When the volume of the chambers has changed by an amount, $\Delta V$, the switch 26, 27 will close. The microcontroller 31 then proceeds to execute instructions represented by block 46 to read the elapsed time, $\tau$, for calculation purposes, and carries out the calculation of molar density according to equation (5) above. The microcontroller 31 then executes instructions to open valve 30 to allow the refilling of chamber 19 to begin another measurement cycle, represented by process block 48. While the chamber 19 is being refilled, a check is made for opening of the switch 26, 27 by movement of the bellows 24, and this is represented by the "YES" branch from decision block 48. While waiting for this event, the microcontroller 31 continues to execute instructions represented by process block 50 to read the pipeline flow meter frequency signal, $f_L'$ and calculate volume flow in the pipeline 12. When the new cycle is ready to begin, the microcontroller 31 loops back to execute the instructions to open valve 34 and release gas for measurement.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A method of measuring volume correction in a gas pipeline for use with a flow meter in the pipeline, the method comprising:

flowing a sample of pipeline gas into a variable volume chamber while maintaining the gas at temperature and pressure of gas in the pipeline;

flowing the sample gas from said variable volume chamber while varying the volume of said chamber to maintain temperature and pressure of gas remaining in said chamber at the temperature and pressure of gas in the pipeline;

measuring the flow rate of sample gas from said chamber with a flow meter;

calculating the molar density of the pipeline gas from the flow rate of the sample gas over a time period during which said chamber changes from a first volume to a second volume; and calculating the volume correction for gas in the pipeline in response to the molar density of the pipeline gas.

2. The method of claim 1, further comprising measuring the volume flow in the pipeline with a flow meter in the pipeline, and calculating the molar flow rate of the gas in the pipeline in response to the volume flow in the pipeline and the molar density of the pipeline gas.

3. The method of claim 2, wherein the flow meter in the pipeline is a turbine meter.

4. The method of claim 2, wherein measuring the flow rate of gas from the said variable volume chamber with a flow meter is carried out at approximately base temperature and pressure.

5. The method of claim 2, further comprising the steps of measuring the base heating value of the sample gas and calculating energy flow rate by multiplying the base volume flow rate by the base heating value of the sample gas.

6. The method of claim 5, wherein the base heating value of the sample gas is measured by analysis of the constituents of the sample gas.

7. The method of claim 5, wherein the base heating value of the sample gas is measured with a calorimeter.

8. The method of claim 5, wherein the base heating value of the sample gas is measured using maximum flame temperature combustion.

9. The method of claim 1, further comprising flowing pipeline gas into a second chamber while maintaining the gas in the second chamber at the pressure of gas in the pipeline.

10. An apparatus for measuring volume correction in a gas pipeline, the apparatus comprising:

a variable volume chamber connected for receiving sample gas from the pipeline and connected for releasing sample gas while volume of the variable volume chamber is varied and while gas remaining in the variable volume chamber is maintained at approximately pipeline temperature and pressure;

means for controlling flow of sample gas into and out of the variable volume chamber;

means for measuring a time period of change of the variable volume chamber from a first volume to a second volume;

means for measuring the molar flow rate of sample gas out of the variable volume chamber;

means for calculating the molar density of the pipeline gas, including means for calculating the flow rate of the sample gas over the time period during which said chamber changes from a first volume to a second volume; and means for calculating volume correction for gas in the pipeline in response to the molar density of the pipeline gas.

11. The apparatus of claim 10, further comprising a flow meter in the pipeline for measuring volume flow of gas in the pipeline, and further comprising means for calculating the molar flow rate of the gas in the pipeline in response to the volume flow in the pipeline and the molar density of the pipeline gas.

12. The apparatus of claim 11, wherein the flow meter in the pipeline is a turbine meter.

13. The apparatus of claim 11, wherein the means for measuring the flow rate of the sample gas from said variable volume chamber include means for measuring flow rate of the sample gas at approximately base temperature and pressure.

14. The apparatus of claim 11, wherein the means for measuring the flow rate of the sample gas from said variable volume chamber is a molar flow meter whose meter flow rate is measured by a change in pressure over a time period.

15. The apparatus of claim 11, further comprising a heating value analyzer connected to receive the sample gas after it is flowed out of the variable volume chamber to measure the heating value of the gas and further comprising means for calculating energy flow rate by multiplying the base volume flow rate by the base heating value of the gas.

16. The apparatus of claim 15, wherein the heating value analyzer includes a gas chromatograph.

17. The apparatus of claim 15, wherein the heating value analyzer includes a calorimetric device.

18. The apparatus of claim 15, wherein the heating value analyzer includes means for measuring the flow of gas and air at maximum flame temperature combustion of the gas.

19. The apparatus of claim 15, wherein heating value analyzer utilizes real time values.

20. The apparatus of claim 15, wherein heating value analyzer utilizes average heating values.

21. An apparatus for measuring volume correction in a gas pipeline, the apparatus comprising:

a body inserted into a pipeline having a first chamber for receiving sample gas from the pipeline, said body being inserted in said pipeline to maintain the sample gas at pipeline gas temperature;

said body also containing a second chamber for receiving gas from the pipeline at pipeline pressure and temperature;

means connected between the pipeline and said first chamber for interrupting the flow of gas from the pipeline to define a volume of sample gas;

means for releasing gas from said first chamber;

means for measuring a time interval of release of gas from said first chamber;

means for measuring a change in volume of said first chamber during release of said gas, while maintaining said chamber at approximately pipeline pressure and temperature;

means for measuring molar flow rate of gas released from said first chamber;

means for calculating molar density of the gas released from said first chamber in response to the time interval of release and the change in volume of said first chamber and in response to the molar flow rate; and means for calculating volume correction for gas in the pipeline in response to the molar density of the pipeline gas.

22. The apparatus of claim 21, further comprising means for calculating volumetric flow rate at base conditions from a pipeline velocity of gas in the pipeline and from the molar density of gas from the first chamber.

23. The apparatus of claim 22, further comprising means for determining heating value of the gas and further comprising means for calculating energy flow rate by multiplying volumetric flow rate at base conditions by the heating value of the gas.

24. The apparatus of claim 23, wherein the means for determining heating value of the gas analyzes constituents of the gas for heating value.

25. The apparatus of claim 23, wherein the means for determining heating value of the gas includes a calorimetric device.

26. The apparatus of claim 23, wherein the means for determining heating value of the gas includes means for measuring the flow of gas and air at maximum flame temperature combustion of the gas.

27. The apparatus of claim 23, wherein the means for determining heating value of the gas utilizes real time values.

28. The apparatus of claim 23, wherein the means for determining heating value of the gas utilizes average heating values.

* * * * *

UNITED STATES PATENT AND TRADEMARK OFFICE
CERTIFICATE OF CORRECTION

Patent No.   : 5,551,282
Dated        : September 3, 1996
Inventor(s)  : William H. Vander Heyden It is certified that error appears in the above-identified patent and that said Letters Patent is hereby corrected as shown below:

Column 4, line 44, "4," should be --$\tau$,--.

Column 5, line 8, "between:two" should be --between two--.

Column 5, line 19, "valve" should be --value--.

Column 6, line 1, "An" should be --$\Delta$n--.

Column 6, line 2, "4" should be --$\tau$--.

Column 6, line 21, "fi" should be --$\hat{n}$--.

Signed and Sealed this

Eleventh Day of February, 1997

Attest:

BRUCE LEHMAN

Attesting Officer    Commissioner of Patents and Trademarks